United States Patent [19]

Van De Waterlaat et al.

[11] Patent Number: 5,432,562
[45] Date of Patent: Jul. 11, 1995

[54] TELEVISION SIGNAL RECEPTION

[75] Inventors: Adrianus C. J. G. Van De Waterlaat; Johannes I. J. Tichelaar; Wouter Venis, all of Eindhoven, Netherlands

[73] Assignee: U.S. Philips Corporation, New York, N.Y.

[21] Appl. No.: 178,149

[22] Filed: Jan. 6, 1994

[30] Foreign Application Priority Data

Jan. 26, 1993 [EP] European Pat. Off. .......... 93200213

[51] Int. Cl.[6] .................. H04N 5/21; H04N 5/213
[52] U.S. Cl. ............................ 348/613; 348/914
[58] Field of Search ............ 348/607, 608, 609, 610, 348/612, 613, 723, 724, 725, 726, 727, 728, 735, 737, 914; H04N 5/21, 5/213, 5/217, 5/62; 333/18; 455/67.6, 70, 71, 72

[56] References Cited

U.S. PATENT DOCUMENTS

| 4,434,440 | 2/1984 | Schiff | 348/723 |
|---|---|---|---|
| 4,490,693 | 12/1984 | Behrend | 348/723 |
| 4,538,180 | 8/1985 | Cluniat | 348/724 |
| 4,658,296 | 4/1987 | Beech | 348/613 |
| 4,984,079 | 1/1991 | Ho et al. | 348/723 |
| 5,198,904 | 3/1993 | Ta et al. | 348/724 |
| 5,323,236 | 6/1994 | Tichelaar et al. | 348/469 |

FOREIGN PATENT DOCUMENTS 92200407 2/1992 European Pat. Off. .

Primary Examiner—James J. Groody
Assistant Examiner—Michael H. Lee
Attorney, Agent, or Firm—Edward W. Goodman

[57] ABSTRACT

In a television signal receiver, including an intermediate frequency (IF) filter (3) having an intermediate frequency filter group delay, and an intermediate frequency (IF) demodulator (5) coupled to the intermediate frequency filter (3), a correction filter arrangement (9, 13, 15) is coupled to the intermediate frequency demodulator (5) and has a programmable group delay for cancelling a group delay precorrection carried out at a transmitter and the intermediate frequency filter group delay.

5 Claims, 1 Drawing Sheet

TELEVISION SIGNAL RECEPTION

BACKGROUND OF THE INVENTION

Description of the Related Art

The invention relates to a television signal receiver comprising an intermediate frequency (IF) filter having an intermediate frequency filter group delay, and an intermediate frequency demodulator coupled to said intermediate frequency filter. The invention also relates to a method of receiving television signals. The invention can be used in both wide aspect ratio and standard aspect ratio television receivers.

Within the transmission of B,G/PAL, a precorrection of group delay is performed at the transmitter. The necessity of this group delay precorrection dates from the time when it was difficult and expensive to make receiver IF-filters with a flat group delay response characteristic. Nowadays, receiver IF-filters with a flat group delay response are available on the market at relatively low prices. Consequently, there is no longer any need for group delay precorrection.

There is a strong drive, coming from German broadcasters, to cancel the group delay precorrection process. They want to do this in two steps, viz. by halving the amount of group delay precorrection by 1994, and by cancelling the group delay precorrection entirely by 2001. However, cancelling the transmitter group delay precorrection causes a noticeable loss of sharpness and a chrominance/luminance delay difference in television receivers which still expect the television signal to have undergone the transmitter-sided precorrection.

SUMMARY OF THE INVENTION

It is, inter alia, an object of the invention to provide a television receiver which can cope with the gradual cancelling of the group delay precorrection. For this purpose, one aspect of the invention provides a television signal receiver comprising an intermediate frequency filter having an intermediate filter group delay, an intermediate frequency demodulator coupled to said intermediate frequency filter, and a correction filter arrangement coupled to said intermediate frequency demodulator and having a programmable group delay for cancelling a group delay precorrection carried out at a transmitter and said intermediate frequency filter group delay.

Another aspect of the invention provides a method of receiving television signals, comprising the steps: intermediate frequency filtering said television signals with an intermediate frequency filtering group delay to obtain IF filtered signals, intermediate frequency demodulating said IF filtered signals to obtain IF demodulated signals, and correction filtering said IF demodulated signals with a programmable group delay for cancelling a transmitter group delay precorrection and said intermediate frequency filtering group delay.

The invention is based on the following considerations. Currently, we have a priori knowledge about the way in which the group delay precorrection characteristic will change in the nearby future. The television receiver has to adapt to this coming situation. The idea that is proposed here is the following. Install an arbitrary IF-filter with an a priori known group delay characteristic in the television signal receiver. After this filter, a new all-pass filter is incorporated with a tunable or programmable group delay response. This programming or tuning is understood to mean, for example, loading a digital filter with a new set of filter coefficients. The purpose of all this is to install an (approximate) inverse characteristic of the summed group delay responses of the group delay precorrection curve and the group delay response of the receiver IF-filter. Three different inverse curves have to be installed:

- the inverse curve of the summed standard group delay precorrection curve and the IF-filter's group delay,
- the inverse curve of the halved precorrection curve and the IF-filter's group delay, and
- the inverse curve of the receiver IF-filter's group delay. If an IF-filter with overall flat group delay is installed, post-filtering will not be necessary.

The second step is to find a way of letting the television signal receiver know which group delay precorrection characteristic is used at the transmitter. This could be signalled to the receiver by, for example:

The wide screen signalling bits (see European patent application 92.200.407.2 filed on 13, Feb. 1992, corresponding to U.S. Pat. Ser. No. 5,323,236). There are many data bits in this (draft) proposal that are not allocated yet.

dealer remote control.

Obviously, solution 1 is preferred because an automatic correction can be achieved thereby.

These and other aspects of the invention will be apparent from and elucidated with reference to the embodiments described hereinafter.

DESCRIPTION OF THE PREFERRED EMBODIMENT

Figure 1:
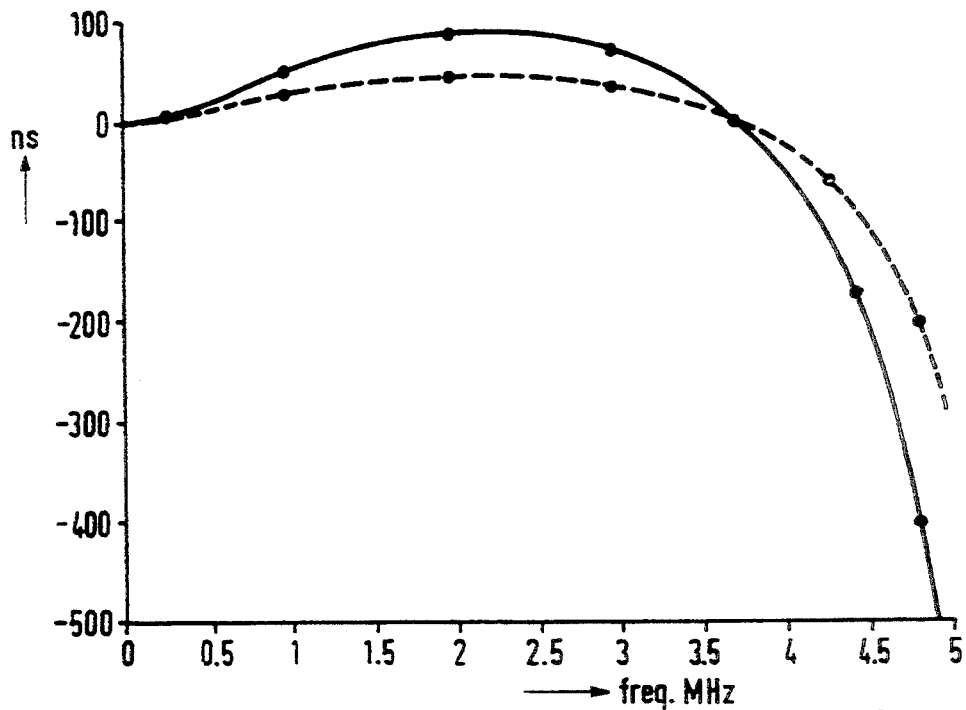
FIG. 1 shows inverse group delay precorrection curves.

FIG. 1 shows inverse group delay precorrection curves for both standard group delay precorrection (solid line) and halved group delay precorrection (broken line). The horizontal axis shows the frequency in MHz. The vertical axis shows the group delay in nanoseconds (ns).

Figure 2:
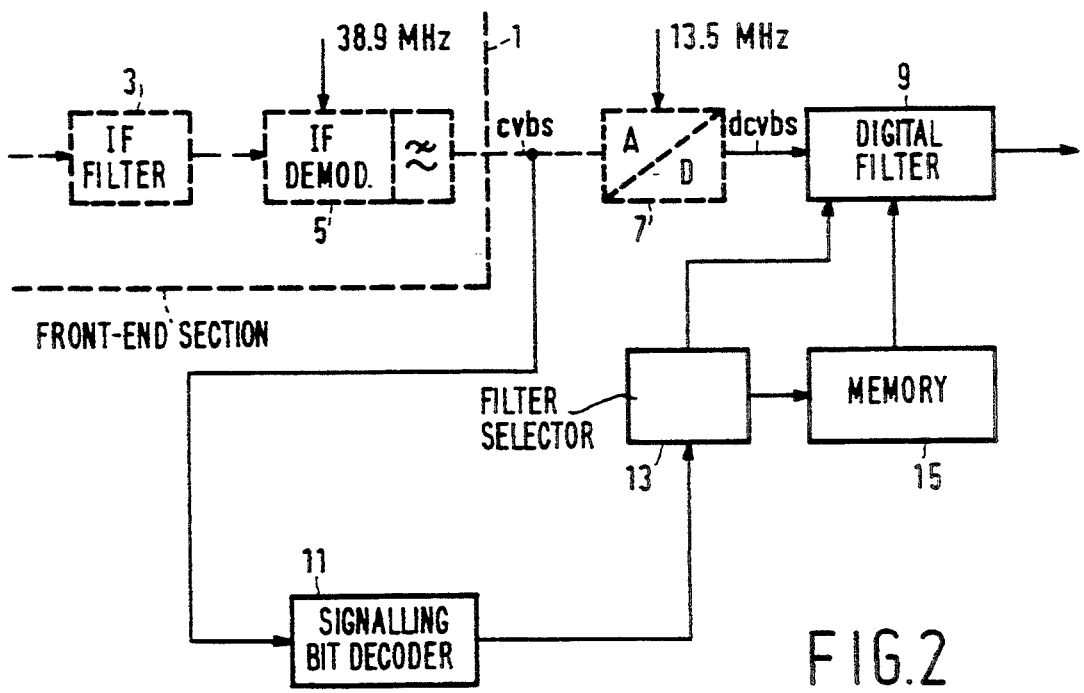
FIG. 2 shows an embodiment of a television receiver in accordance with the present invention.

In FIG. 2, an implementation is sketched of an automatic group delay precorrection canceller in accordance with the present invention. This canceller is installed after a front-end section 1 and operates on composite baseband video CVBS. The front-end section 1 comprises an intermediate frequency (IF) filter 3 preceding an IF-demodulator 5. An A/D converter 7 is connected to the output of the front-end section 1 and produces a 13.5 MHz sampled composite baseband video signal DCVBS with an at least 8-bit representation of the sample values. The samples are fed to the input of a digital filter 9. The filter coefficients of this digital filter 9 are determined by (at least) 2 bits information of wide screen signalling bits encoded with the extended television signal. For more details about these signalling bits, reference is made to European patent application 92.200.407.2 filed on 13, Feb. 1992 corresponding to U.S. Pat. Ser. No. 5,323,236. The signalling bits are decoded from the CVBS signal by a signalling bits decoder 11 which supplies the signalling bits to a filter selector 13. The filter selector 13 controls a memory 15 in which three sets of filter coefficients are stored. Whenever a change of information occurs in the relevant signalling bits, the filter selector 13 signals to the digital filter 9 that a new set of filter coefficients has to be loaded from the memory 15. This new set of filter coefficients corresponds to the inverse curve of the summed group delay characteristics of the IF-filter 3 installed in the receiver and the precorrection characteristic that is signalled by the transmitter to the receiver. Now, at the output of the digital filter 9, a digital version of composite baseband video with a flat group delay curve can be taken off for further distribution. If no signalling information is present, a default filter state is presumed to be present.

It should be noted that the above-mentioned embodiments illustrate rather than limit the invention, and that those skilled in the art will be able to design many alternative embodiments without departing from the scope of the appended claims. For example, it is possible to use the correction filter arrangement of the present invention to correct any group delay errors in the television signal receiver circuitry like a surface acoustic wave filter and a suppress sound carriers in the video signal path. The correction can be carried out very simply by a receiver manufacturer by measuring any group delay error and programming the correction filter arrangement such that the group delay error is compensated for.

We claim:

1. A television signal receiver, comprising:
    an intermediate frequency (IF) filter having an intermediate frequency filter group delay, said IF filter having an input for receiving a television signal and an output for providing an IF filtered signal;
    an intermediate frequency (IF) demodulator coupled to the output of said intermediate frequency filter for demodulating said IF filtered signal to obtain an IF demodulated signal at an output; and
    a correction filter arrangement coupled to the output of said intermediate frequency demodulator and having a programmable group delay for cancelling a group delay precorrection carried out at a transmitter, and said intermediate frequency filter group delay.

2. A television signal receiver as claimed in claim 1, further comprising a signalling bits decoder coupled to said intermediate frequency demodulator for furnishing a control signal for said correction filter arrangement.

3. A television signal receiver as claimed in claim 1, wherein said correction filter arrangement comprises:
    filter means coupled to the output of said intermediate frequency demodulator and having said programmable group delay;
    memory means for storing a plurality of filter coefficient sets for said filter means;
    control signal generating means for generating a control signal indicative of one of said plurality of filter coefficient sets; and
    filter selection means coupled to an output of said control signal generating means for receiving said control signal, said filter selection means having an output coupled to said memory means for causing said memory means to applied one of said plurality of filter coefficient sets to said filter means in response to said control signal applied to said filter selection means.

4. A television signal receiver as claimed in claim 1, wherein said correction filter arrangement is programmed to compensate for any television signal receiver circuitry group delay errors.

5. A method of receiving television signals, comprising the steps of:
    intermediate frequency (IF) filtering said television signals with an intermediate frequency filtering group delay to obtain IF filtered signals;
    intermediate frequency demodulating said IF filtered signals to obtain IF demodulated signals; and
    correction filtering said IF demodulated signals with a programmable group delay for cancelling a transmitter group delay precorrection and said intermediate frequency filtering group delay.

* * * * *